March 13, 1962 G. W. CURRAN ETAL 3,024,586
LAWN MOWER OR SIMILAR WHEELED VEHICLE WITH ADJUSTABLE SKIDS
Filed Aug. 22, 1958 2 Sheets-Sheet 1

INVENTOR.
GEORGE W. CURRAN
AND
JOHN A. STEIN
BY
ATTORNEY

March 13, 1962 G. W. CURRAN ETAL 3,024,586
LAWN MOWER OR SIMILAR WHEELED VEHICLE WITH ADJUSTABLE SKIDS
Filed Aug. 22, 1958 2 Sheets-Sheet 2
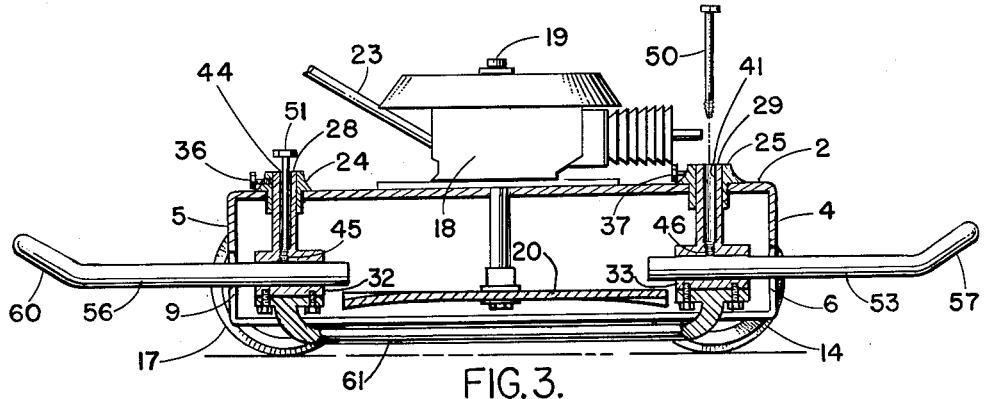
INVENTOR.
GEORGE W. CURRAN
AND
JOHN A. STEIN
BY
ATTORNEY 3,024,586
LAWN MOWER OR SIMILAR WHEELED VEHICLE
WITH ADJUSTABLE SKIDS
George W. Curran, 2770 Gravois Ave., and John A. Stein,
4715 Plover Ave., both of St. Louis, Mo.
Filed Aug. 22, 1958, Ser. No. 756,601
3 Claims. (Cl. 56—25.4)

This invention relates in general to land vehicles and, more particularly, to lawn mowers and similar wheeled vehicles having adjustable runners or skids.

In recent years it has become quite popular for home owners to purchase power mowers for use in cutting their lawns. These lawn mowers ordinarily consist of a power driven rotatable cutter and a plurality of ground-contacting wheels, all of which are mounted on a metal frame. In operating these power mowers, the cutter must necessarily come quite close to the ground in order to cut the grass to a satisfactorily short height, but since many lawns are uneven in contour, it frequently happens that the cutter will dig a mound, depression, or similar obstruction in the lawn as the lawn mower passes thereover. Consequently, under these circumstances, the cutter tends to tear away or "scalp" sections of the lawn in the region of the obstructions and thus leave the lawn with an unsightly appearance. Furthermore, where the contour of the lawn is uneven and filled with obstructions, it is sometimes difficult to maneuver the lawn mower. Moreover, as the cutter digs into the lawn it sometimes throws bits of dirt and rocks which might result in injury to persons or property nearby.

It is, therefore, a primary object of the present invention to provide a lawn mower with adjustable runners or skids in which the skids prevent the cutting blade from digging into and damaging the lawn.

It is a further object of the present invention to provide a lawn mower of the type stated which is easily maneuvered over obstructions and uneven ground.

It is also an object of the present invention to provide a lawn mower of the type stated which materially reduces the possibility of damage to the cutting blade due to ground obstructions.

It is an additonal object of the present invention to provide a lawn mower of the type stated wherein the skids or runners are readily adjustable in accordance with the terrain of the lawn on which the mower is used.

With the above and other objects in view, our invention resides in the novel features of form, construction, arrangement, and combination of parts presently described and pointed out in the claims.

In the accompanying drawings—

Figure 1:
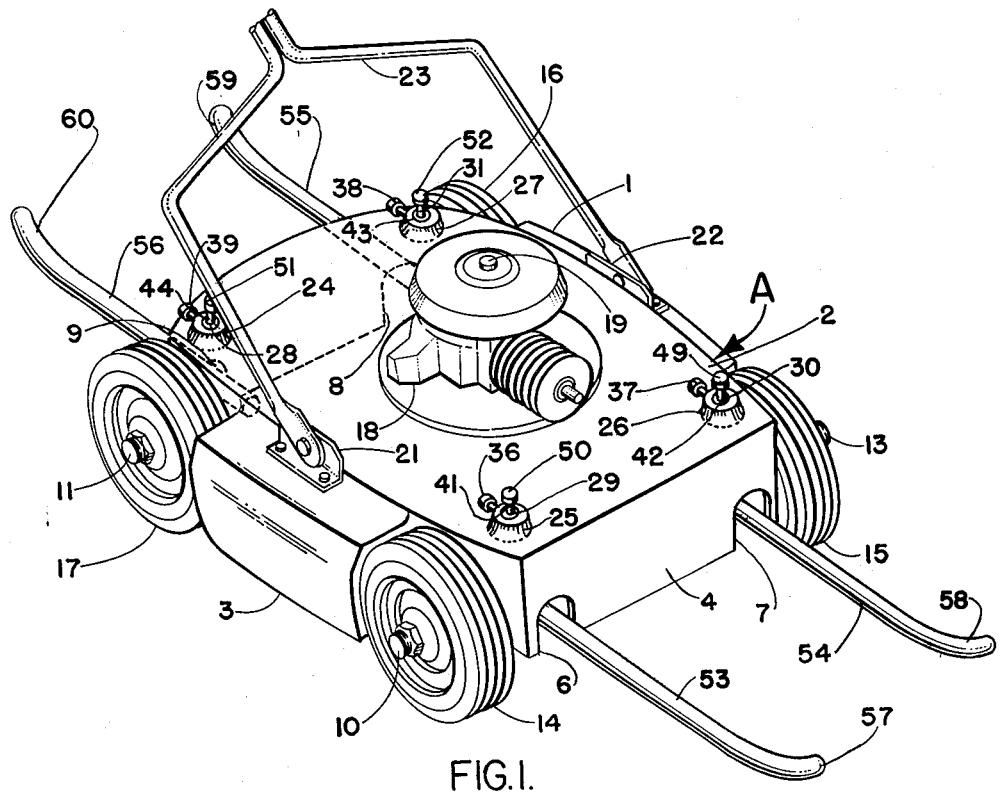
FIG. 1 is a perspective view of a lawn mower constructed in accordance with and embodying the present invention.
Figure 2:
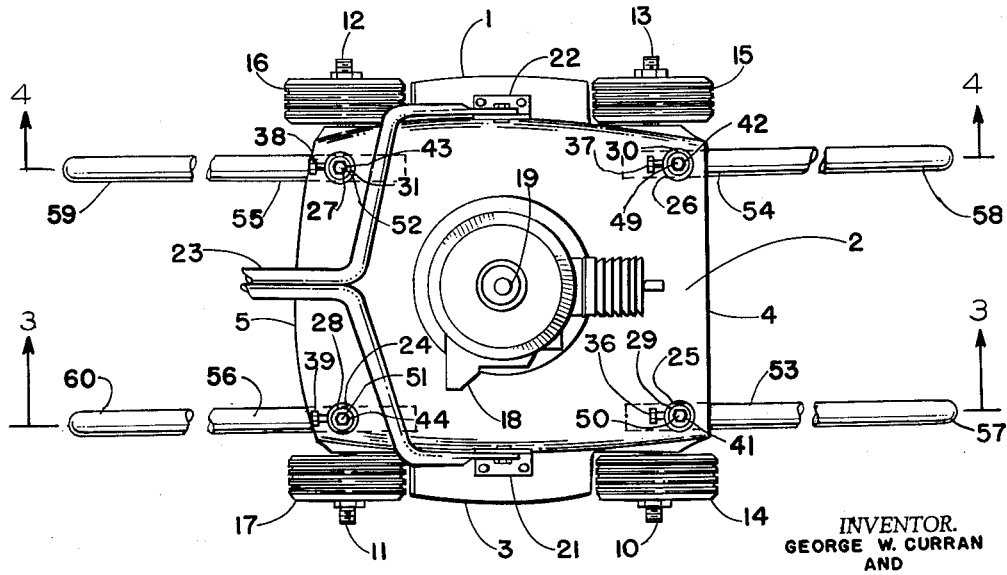
FIG. 2 is a top plan view of the lawn mower.

FIGS. 3 and 4 are sectional views taken along lines 3—3 and 4—4, respectively, of FIG. 2;

FIG. 5 is a fragmentary sectional view taken along line 5—5 of FIG. 4; and

FIGS. 6 and 7 are elevational views of the lawn mower showing the operation of the skids or runners thereon.

Referring now in more detail and by reference characters to the drawings, which illustrate a preferred embodiment of the present invention, A designates a lawn mower comprising a shell-like chassis or frame 1, preferably formed of heavy gauge sheet metal and having a horizontal wall 2 provided at its outer margins with a depending skirt 3, the latter being cut away along its front and rear sections 4, 5, in the provision of downwardly opening slots 6, 7, 8, 9. Also mounted on the skirt 3 are axle-spindles 10, 11, 12, 13, for rotatably supporting ground-contacting wheels 14, 15, 16, 17.

Bolted or otherwise rigidly secured to the wall 2 somewhat centrally thereof, and extending upwardly therefrom, is a suitable motor or engine 18 having a rotatable drive shaft 19 which projects downwardly through the wall 2 and, at its lower end, is provided with a cutter 20. Also rigidly mounted on the wall 2 are brackets 21, 22, for operatively supporting an upwardly inclined handle 23.

Welded or otherwise rigidly mounted in the wall 2 are four spaced bosses 24, 25, 26, 27, which slidably receive vertical rods 28, 29, 30, 31, the latter projecting downwardly within the frame 1 and terminating at their lower ends in sleeves 32, 33, 34, 35. Upwardly from the wall 2, the bosses 24, 25, 26, 27, are provided with tapped horizontal holes for threadedly receiving set screws 36, 37, 38, 39, which are adapted to bear against the flattened portion 40 formed on each of the rods 28, 29, 30, 31, and thereby hold the rods 28, 29, 30, 31, rigidly within the bosses 24, 25, 26, 27. The rods 28, 29, 30, 31, are, furthermore, provided with central bores 41, 42, 43, 44, the lower portions 45, 46, 47, 48, of which are tapped, and disposed within the bores 41, 42, 43, 44, are set bolts 49, 50, 51, 52, the lower ends of which are threaded for engagement with the threads 45, 46, 47, 48. Mounted in the sleeves 32, 33, 34, 35, are horizontally extending rodlike runners or skids 53, 54, 55, 56, which project through the slots 6, 7, 8, 9, and extend a substantial distance forwardly and rearwardly of the frame 1 and terminate at their outer ends in upturned portions 57, 58, 59, 60.

Bolted or otherwise rigidly mounted on the under faces of the sleeves 32, 33, and extending horizontally therebetween is a somewhat U-shaped skid-rod 61 which is located below the plane of the cutter 20 and above the plane which is tangent to the bottom of the wheels 15, 16, 17, or, in other words, above ground level. Similarly bolted on the under faces of the sleeves 34, 35, and extending horizontally therebetween is a U-shaped skid-rod 62 which is identical in size and shape to the skid-rod 61 and is positioned in laterally spaced parallelism with respect thereto. In this connection, it may be noted that it is conventional practice in the design of many mowers of the type herein described to provide adjustment means for varying the height of the wheels in reference to the plane of the cutter or blade and, in such case, the location of the skid-rods 61, 62, should be above the ground level position when the wheels are in their uppermost position of adjustment.

In use, the set screws 36, 37, 38, 39 are loosened and the rods 28, 29, 30, 31 are elevated or lowered so as to position the skids 53, 54, 55, 56, at the desired elevation from the ground, whereupon, the set screws 36, 37, 38, 39 are tightened. The set bolts 49, 50, 51, 52 are loosened, allowing the skids 53, 54, 55, 56 to shift lengthwise so as to position the end portions 57, 58, 59, 60, at any desired position forwardly and rearwardly of the frame 1, whereupon the set bolts 49, 50, 51, 52 are tightened to lock the skids 53, 54, 55, 56, in position within the sleeves 32, 33, 34, 35. The motor 18 is then started and the lawn mower A moved along the ground on the wheels 14, 15, 16, 17, in the usual manner. As the lawn mower A approaches an obstruction such as a mound m, the forwardly extending skids 53, 54 ride up over the mound m and elevate the front end of the frame 1, together with the wheels 14, 16. As this happens, the cutter 20 will also be elevated, allowing it to pass over the mound m at a sufficient height to cut the grass, while at the same time preventing the cutter 20 from digging into the mound m. As the lawn mower A moves away from the mound m, the rearwardly extending skids 55, 56 will ride over the mound m and tend to elevate the rear end of the chassis 1, together with the wheels 16, 17, allowing the cutter 20 to clear the mound *m*. Similarly, if the lawn mower A encounters a dip or depression *d* in the lawn, the skids 53, 54, 55, 56 lift the wheels 14, 15, 16, 17, and frame 1 off the ground, preventing the cutter 20 from digging into and damaging the lawn.

It will, therefore, be apparent that the adjustable skids permit the lawn mower to be easily maneuvered over obstructions without damage to the blade or without digging into and "scalping" the lawn. Moreover, since the skids 53, 54, 55, 56 are adjustable as to both length and height, they may be quickly and easily positioned for most effective use.

It should be understood that changes and modifications in the form, construction, arrangement, and combination of the several parts of the lawn mower or similar wheeled vehicle with adjustable skids may be made and substituted for those herein shown and described without departing from the nature and principle of our invention.

Having thus described our invention, what we claim and desire to secure by Letters Patent is—

1. A lawn mower of the type having a cutter, a frame and supporting wheels, at least one runner-like member projecting fore-and-aft from said frame, said member being mounted in supports on said frame, said supports having at least two adjusting means thereon permitting vertical and fore-and-aft adjustment of said member.

2. A lawn mower of the type having a cutter, a frame and four supporting wheels, four independent runner-like members respectively projecting fore-and-aft from said frame, each of said runner-like members being independently mounted in supports, said supports being mounted on said frame respectively in proximity to said wheels, said supports each having at least two adjusting means thereon for respectively permitting vertical and fore-and-aft adjustment of the runner-like member carried by such supporting means.

3. A lawn mower as defined in claim 2 further characterized in that two of said runners project outwardly from the forward end of the frame as a first spaced parallel pair and the other two of the runners project from the rearward end of the frame as a second spaced parallel pair, and a pair of auxiliary runners mounted at their ends to and extending between pairs of said supports along opposite sides of the frame, said auxiliary runners being located in downwardly spaced relation to the first and second pairs of runners.

References Cited in the file of this patent

UNITED STATES PATENTS

| | | |
|---|---|---|
| 1,178,722 | Hoover | Apr. 11, 1916 |
| 1,304,331 | Leicht | May 20, 1919 |
| 1,571,880 | Young | Feb. 2, 1926 |
| 1,693,862 | Otto | Dec. 4, 1928 |
| 1,744,654 | Lorenzen | Jan. 21, 1930 |
| 2,167,222 | Shelor | July 25, 1939 |
| 2,253,452 | Urschel | Aug. 19, 1941 |
| 2,505,377 | Barker et al. | Apr. 25, 1950 |
| 2,529,328 | Carter | Nov. 7, 1950 |
| 2,710,514 | Broussard | June 14, 1955 |
| 2,718,739 | Long | Sept. 27, 1955 |
| 2,834,608 | Wixson | May 13, 1958 |
| 2,977,739 | Lustyan | Apr. 4, 1961 |

FOREIGN PATENTS

| | | |
|---|---|---|
| 825,639 | Germany | Dec. 20, 1951 |